United States Patent [19]
Matviya et al.

[11] Patent Number: 5,356,849
[45] Date of Patent: Oct. 18, 1994

[54] CATALYTIC CARBON

[75] Inventors: Thomas M. Matviya; Richard A. Hayden, both of Pittsburgh, Pa.

[73] Assignee: Calgon Carbon Corporation, Pittsburgh, Pa.

[21] Appl. No.: 7,164

[22] Filed: Jan. 21, 1993

[51] Int. Cl.$^5$ .................... B01J 21/18; C01B 31/12; C01B 31/10; C01B 13/00

[52] U.S. Cl. .................... 502/180; 423/579; 502/416; 502/417; 502/423; 502/434

[58] Field of Search ............... 502/180, 416, 423, 429, 502/434, 417

[56] References Cited

U.S. PATENT DOCUMENTS

| | | | |
|---|---|---|---|
| 3,909,449 | 9/1975 | Nagai et al. | 252/422 |
| 4,624,937 | 11/1986 | Chau et al. | 502/180 |
| 5,173,466 | 12/1992 | Heins et al. | 502/180 |

FOREIGN PATENT DOCUMENTS

| | | | |
|---|---|---|---|
| 0490317 | 6/1992 | European Pat. Off. | 502/180 |
| 3620425 | 6/1987 | Fed. Rep. of Germany . | |
| 4031968A1 | 4/1992 | Fed. Rep. of Germany . | |
| 0158331 | 4/1989 | Japan . | |

OTHER PUBLICATIONS

J. Wang and W. Xie, "An Appraisal of the Surface Chemistry and the Catalytic Oxidative Activity of Nitrogen-Modified Activated Carbon by XPS," *Cuihua Xuebao* 10 (4), 357 (1989).

H. P. Boehm, A. R. de Rincon, T. Stohr, B. Tereczki, and A. Vass, "Activation of Carbon Catalysts for Oxidation Reactions by Treatment with Ammonia or Hydrogen Cyanide, and Possible Cause for the Loss of Activity During Catalytic Action," *Journal de Chemie Physique* 84, 449 (1987).

Y. Komatsubara, S. Ida, H. Fujitsu, and I. Mochida, "Catalytic Activity of PAN-Based Active Carbon Fibre (PAN-ACF) Activated with Sulphuric Acid for Reduction of Nitric Oxide with Ammonia," *Fuel* 63, 1738 (1984)

L. Singoredjo, F. Kapteijn, J. A. Moulijn, and J. M. Martin-Martinez, "Modified Activated Carbon for Low Temperature Selective Catalytic Reduction of NO with NH3," *20th Bien, Conf. on Carbon,* Jun. 23–28, 1991, p. 78.

W. Farmer and J. B. Firth, "The Catalytic Activity of Carbons from Aromatic Hydrocarbons and Some Derivatives," *J. Phys. Chem.* 28, 1136 (1924).

P. F. Bente and J. H. Walton, "the Catalytic Activity of Activated Nitrogenous Carbons," *J. Phys. Chem.* 47, 133 (1943).

J. Watanabe and T. Shiramoto, "Activated Carbon Electrodes for Air-Depolarized Wet Cells III: The Decomposition of Hydrogen Peroxide by Activated Charcoal," *J. Electrochem. Soc. Japan* 20, 386 (1952).

E. Naruko, "Ammonia-Activated Charcoal," *Kogyo Kagaku Zasshi* 67(12), 2023 (1964).

I. Mochida, Y. Masumura, T. Hirayama, H. Fujitsu, S. Kawano, and K. Gotoh, "Removal of SO2 in Flue Gas by Polyacrylonitrile Based Active Carbon Fiber (PAN-ACF)," *Nippon Kagaku Kaishi N4,* 269 (1991).

A. Nishijima, H. Hagiwara, M. Kurita, A. Ueno, T. Sato, Y. Kiyosumi, and N. Todo, "Characterization of Nitrogen-Containing Active Carbon Catalysts for SO2 Removal," *Bull Chem. Soc. Japan* 55, 2618 (1982).

S. K. Naito, S. Takagi, H. Ebata, and S. Takei, "Activation of Carbon Catalysts for Oxidation of Iron (II) Ion (List continued on next page.)

*Primary Examiner*—Paul E. Konopka
*Attorney, Agent, or Firm*—Cindrich & Titus

[57] ABSTRACT

Carbonaceous chars capable of catalytically decomposing aqueous hydrogen peroxide at higher rates at given char densities than other known catalytic chars are provided for. This improvement is provided by an increase in the catalytic activity at a given char density of the said catalytically-active carbonaceous char. The catalytically-active carbonaceous chars are useful for, but not limited to, the catalytic conversion of $H_2S$, $SO_x$, $NO_x$, peroxides, and/or chloramines in liquid and/or gaseous media.

4 Claims, 2 Drawing Sheets

OTHER PUBLICATIONS in Sulfuric Acid Solution by Oxygen," *Nippon Kagaku Kaishi 4,* 467 (1979).

I. Gavat, C. Costea, and A. Draganescu, "Catalytic Activity of Pyrolized Urea-Formaldehyde Polymers and of Some Melamine and Benzsoguanamine Condensation Polymers with Substances Containing CO Groups," *Revue Roumaine de Chimie 12,* 1127 (1967).

K. Boki, S. Tanada, and T. Miyoshi, "Removal by Adsorption of Hydrogen Sulfide by a New Type of Activated Carbon Containing Nitrogen," *Nippon Eiseigaku Zasshi* 38(5), 877 (1983).

H. Sano and H. Ogawa, "Preparation and Application of N-Introduced Carbon II: Application for Removal of Sulfur Oxides from Flue Gas," *Osako Kogy Gijutsu Shikenjo Koho* 26, 92 (1975).

K. Boki, S. Tanada, T. Kita, T. Nakamura, H. Takahashi, and R. Hamada, "Increase in Micropore Volume of N-Containing Activated Carbon Treated with Methylol Melamine Urea Solution," *Experientia* 39, 143 (1983).

S. Tanada, T. Kita, K. Boki, and Y. Kozaki, "Preparation of Narrow Pores Carbon Suitable for Hydrogen Sulfide Asorption," *J. Environ. Sci. Health* A20 (1), 87 (1985).

B. Stohr, H. P. Boehm, and R. Schlogl, "Enhancement of the Catalytic Activity of Activated Carbons in Oxidation Reactions by Thermal Treatment with Ammonia or Hydrogen Cyanide and Observation of Superoxide Species as a Possible Intermediate," *Carbon* 29 (6), 707 (1991).

M. Zuckmantel, R. Kurth, and H. P. Boehm, "Carbons as Catalytic Agents for the Oxidation of Sulfurous Acid," *Z. Naturforsch.* 34b, 188 (1979).

Y. Maki, "Relation Between Performances of the Air-depolarized Cell and Catalytic Activity of Charcoals," *J. Electrochem, Soc. Japan (Overseas Ed.),* 27, No. 4–6 E 115 (1959).

R. Manoharan, A. K. Shukla, "Oxygen-Reducing Porous Carbon Electrode for Electrochemical Power Sources with Alkaline Electrolytes," *Journal of Power Sources,* 10 (1983) 333–341.

D. M. Drazic and R. R. Adzic, "Influence of Surfacde Treatment of Active Carbon on Its Activity in Fuel Cell Electrodes," *Flasnik Hemijskog Drustva Beograd,* 349(2–4) 203(10) (1969) CA 73(26):136627.

CATALYTIC CARBON

FIELD OF THE INVENTION

The present invention relates to a stable, catalytically-active, high-temperature carbonaceous char capable of rapidly decomposing hydrogen peroxide in aqueous solutions.

BACKGROUND OF THE INVENTION

Carbonaceous chars which are capable of functioning as catalysts per se are well known. The presence of charcoal has been known to enhance a variety of oxidation reactions, including the oxidation of hydrogen sulfide and $SO_2$. In those instances where carbonaceous chars have been observed to affect such reactions, they have functioned generally as true catalysts, i.e. they have affected only the rate of a given reaction, but have not themselves been changed by the reaction to any significant degree.

Carbonaceous chars prepared from nitrogen-rich starting materials have been known to be much more effective in catalyzing certain reactions, such as hydrogen peroxide decomposition, than those prepared from nitrogen-poor feedstocks. Similarly, enhanced catalytic properties are known to be imparted into chars prepared from nitrogen-poor starting materials by exposing such chars to nitrogen-containing compounds such as ammonia at high temperatures. More recently, catalytically-active chars have been prepared by the calcination or calcination/activation of low- or high-temperature chars prepared from nitrogen-rich materials such as polyacrylonitrile and polyamide. Catalytically-active chars also have been prepared from nitrogen-poor starting materials by the calcination of high-temperature chars in the presence of nitrogen-containing compounds such as ammonia. In all cases, high-temperature carbonaceous chars are those produced by thermal treatment at temperatures greater than 700 C. Low-temperature carbonaceous chars have not been subjected to temperatures greater than 700 C.

Advantages have been found in oxidizing the high-temperature char prepared from nitrogen-poor feedstocks prior to or during exposure to nitrogen-containing compounds. Similarly, oxidizing a low-temperature char prepared from nitrogen-rich feedstocks such as polyacrylonitrile has been found to enhance the catalytic activity.

However, all of the prior art processes for preparing carbonaceous chars which are catalytically active per se have certain disadvantages which limit their overall utility and practicality. For example, nitrogen-rich starting materials, such as polyacrylonitrile or polyamide, are expensive and have been found to generate large amounts of cyanide and other toxic gases upon carbonization. Those processes which use chars derived from nitrogen-poor starting materials invariably use high-temperature chars which require further processing. Since such materials are fairy inert chemically, the use of extensive and aggressive chemical post-treatments is usually required to effect significant changes in their catalytic capabilities. In so doing, such changes are usually brought about only at the expense of carbon yield as reflected in the density of the final product at a given level of catalytic activity. The use of high-temperature chars is, therefore, inevitably more expensive than the direct use of the raw materials from which they are derived. Additionally, such processes entail the use of large amounts of toxic and/or hazardous reagents such as nitric acid, surfuric acid or ammonia, and the generation of significant amounts of toxic and/or hazardous byproducts such as sulfur dioxide, nitric oxide, and cyanide.

Accordingly, it is the object of the present invention to provide a catalytically-active carbonaceous char which rapidly decomposes hydrogen peroxide in aqueous solutions, together with, optionally, a high adsorption micropore volume at a given carbon density. Compared to activated carbons and cokes prepared by conventional means, such materials have high utility as catalysts for a number of reactions, including, but not limited to, the conversion of peroxides, chloramines, sulfides, sulfur dioxide and nitric oxide.

SUMMARY OF THE INVENTION

The present invention comprises high-temperature carbonaceous chars capable of rapidly decomposing hydrogen peroxide in aqueous solutions. Such carbons may also possess a high adsorption micropore volume or such other attributes which make them useful as catalysts in a variety of chemical reactions. The catalytic carbonaceous chars of the present invention have an exceptionally high rate of catalytic activity measured in $t-\frac{3}{4}$ time[1]. The $t-\frac{3}{4}$ time is reported in units of minutes. Such chars of the present invention are defined by a relationship wherein $(t-\frac{3}{4}$ time$) \leq (15.9$ cc min$) \times ($Apparent Density$) - 2.98$ min. Apparent Density is determined in accordance with test method TM-7 of Calgon Carbon Corporation, Pittsburgh Pa. (functionally equivalent to ASTM D2854-83).

[1] Catalytic activity is measured by the test procedure set forth in U.S. patent application Ser. No. 08/006,470 filed Jan. 21, 1993 by the assignee of the present invention and incorporated herein by reference. This test measures the time of decomposing aqueous hydrogen peroxide using the catalytic carbonaceous char, in particular, the test measures the elapsed time required for 0.250 gms. of such carbon to decompose a standard amount of hydrogen peroxide (0.42 moles $H_2O_2$). The $t-\frac{3}{4}$ time is three-fourths of the elapsed time required for such decomposition as indicated by measuring the temperature using accelerating rate calorimetric methods as described in more detail hereinafter. Thus, the lower the time, the higher is the level of catalytic activity. Typical values of the $t-\frac{3}{4}$ time for commercial activated carbons are in excess of 30 minutes.

In a preferred embodiment of the invention, such chars are prepared directly from an inexpensive and abundant nitrogen-poor feedstock such as bituminous coal or a bituminous coal-like carbonaceous material such as those derived from higher or lower rank coals and ligno-cellulose materials by various chemical treatments. Examples of higher rank coals include anthracite and semi-anthracite coals while examples of lower rank coals include peat, lignite, and sub-bituminous coal. Examples of the chemical treatment of these materials include alkali metal treatment of the high rank materials and zinc chloride or phosphoric acid treatment of the low rank materials. These types of treatments can also be applied to ligno-cellulose materials to convert them into bituminous coal-like materials.

In a preferred embodiment of the invention the feedstock material is pulverized, mixed if necessary with a small amount of a suitable binder such as pitch, briquetted or otherwise formed, and sized. The sized material is then extensively oxidized at temperatures less than 700 C, preferably less than 400 C. The oxidation is continued until additional gains in the catalytic activity of the final product are no longer evident. The oxidation is well beyond that typically required to remove the coking properties of bituminous coals, and produces an optimally oxidized low-temperature carbonaceous char. The oxidized low-temperature char is then exposed to a nitrogen-containing compound such as urea during, not after, the initial calcination and condensation of the carbon structure. This treatment is carried out by heating the low-temperature oxidized char to high temperatures, preferably between 850 C. and 950 C., in the presence of the nitrogen-containing compound. This heating is preferably conducted under an atmosphere that is inert except for the gases and vapors attributable to the char and/or the nitrogen-containing compound. The heating rate and temperatures are selected such that additional gains in the catalytic activity of the final product are no longer evident. The nitrogen compound treated, high-temperature char may then be further calcined and/or activated to the desired density at temperatures above 700 C. in steam and/or carbon dioxide, with or without the addition of other gasifying agents such as air.

The calcined or calcined/activated char is then cooled in an oxygen-free or otherwise inert atmosphere to temperatures less than 400 C., preferably less than 200 C. Additional gains in catalytic activity may be realized by repeating the oxidation/exposure to nitrogen-containing compounds/calcination or calcination/activation/inert cooling as many times as may be desired. Alternatively, any other method known to generate catalytic activity in high temperature chars may be applied to the resultant product to further enhance its catalytic activity.

The advantages of the present invention will become apparent from a perusal of examples of presently preferred embodiments.

PRESENTLY PREFERRED EMBODIMENTS

The first six examples illustrate preferred embodiments of the invention. These six examples demonstrate the high catalytic activity achievable at a given carbonaceous char density using the invention. Examples seven through ten demonstrate the lower catalytic activity achievable at a given carbonaceous char density by the prior art.

EXAMPLE 1

A bituminous coal was pulverized, mixed with 6% coal tar pitch, and briquetted. The resultant briquettes were crushed and sized to produce an approximately less than 6 mesh size and greater than 16 mesh size (U.S. Standard Series sieves) material. In the presence of large quantities of excess air, this material was oxidized by heating from 100 C. to 200 C. at a rate of 200 C. per hour, then from 200 C. to 350 C. at a rate of 100 C. per hour, then held at 350 C. for 4.5 hours, and finally heated from 350 C. to 450 C. at a rate of 100 C. per hour.

The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, portions of the oxidized, impregnated low-temperature char were rapidly heated to 900 C. under an inert gas atmosphere and maintained at that temperature for 1 hour. Immediately following this calcination treatment the portions of the resultant material were activated with steam for various time periods. After activation, the materials were cooled to ambient temperature under an inert atmosphere. Three of the activated carbons so produced, when sized to less than 6 mesh (U.S. Standard Series Sieves) and greater than 16 mesh (U.S. Standard Series Sieves) exhibited Apparent Densities (Test Method TM-7, Calgon Carbon Company, Pittsburgh Pa.) of 0.589 grams per cc, 0.558 grams per cc, and 0.524 grams per cc.

The catalytic activities of these samples, determined as $t-\frac{3}{4}$ times, were 5.1 minutes for the carbonaceous char exhibiting the 0.589 g/cc Apparent Density, 3.8 minutes for the char exhibiting the 0.558 g/cc Apparent Density, and 3.1 minutes for the char exhibiting the 0.524 g/cc Apparent Density.

Figure 1:
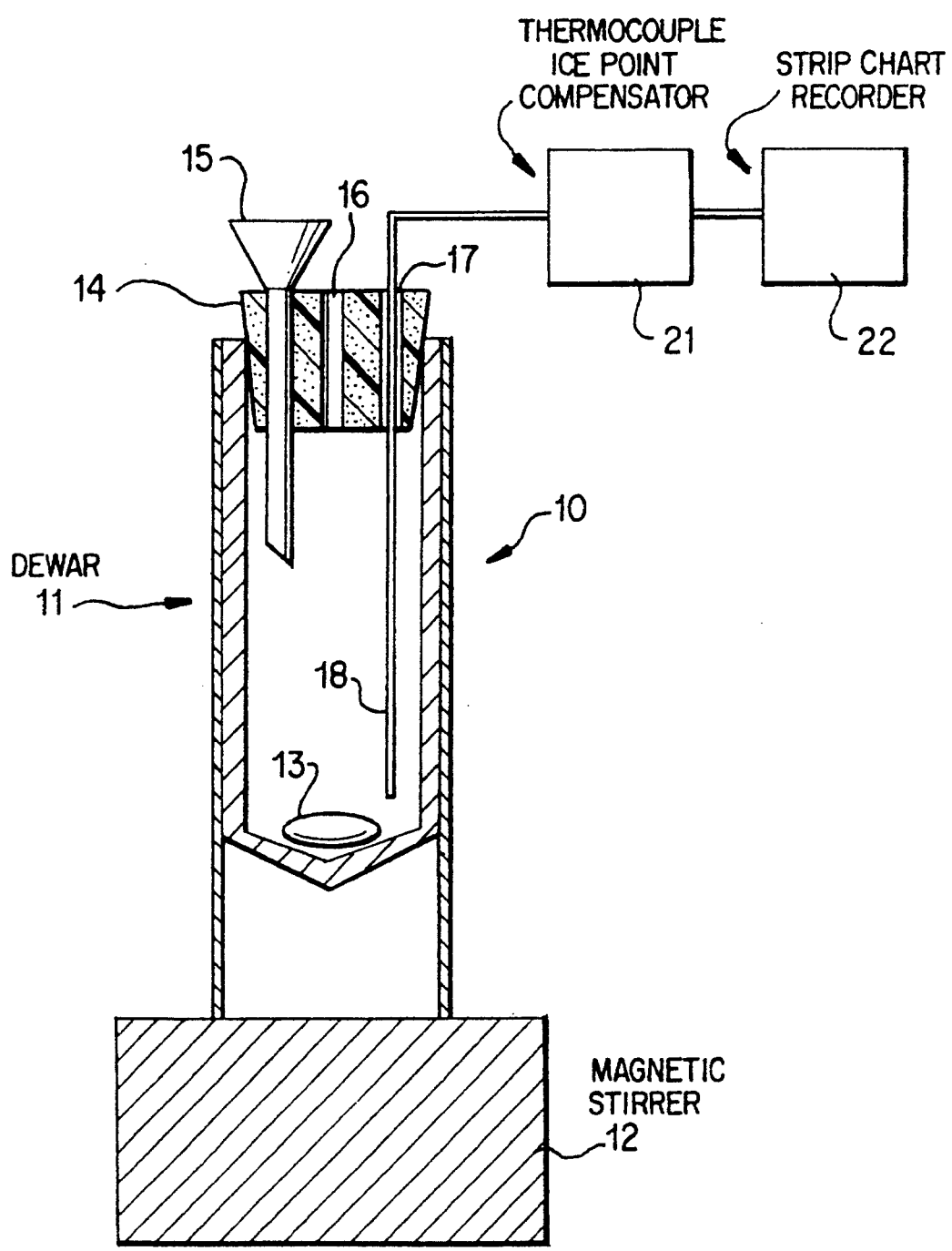
FIG. 1 is a diagrammatic view of a representative apparatus for measuring the catalytic activity of carbonaceous chars ($t-\frac{3}{4}$ time.)
Figure 2:
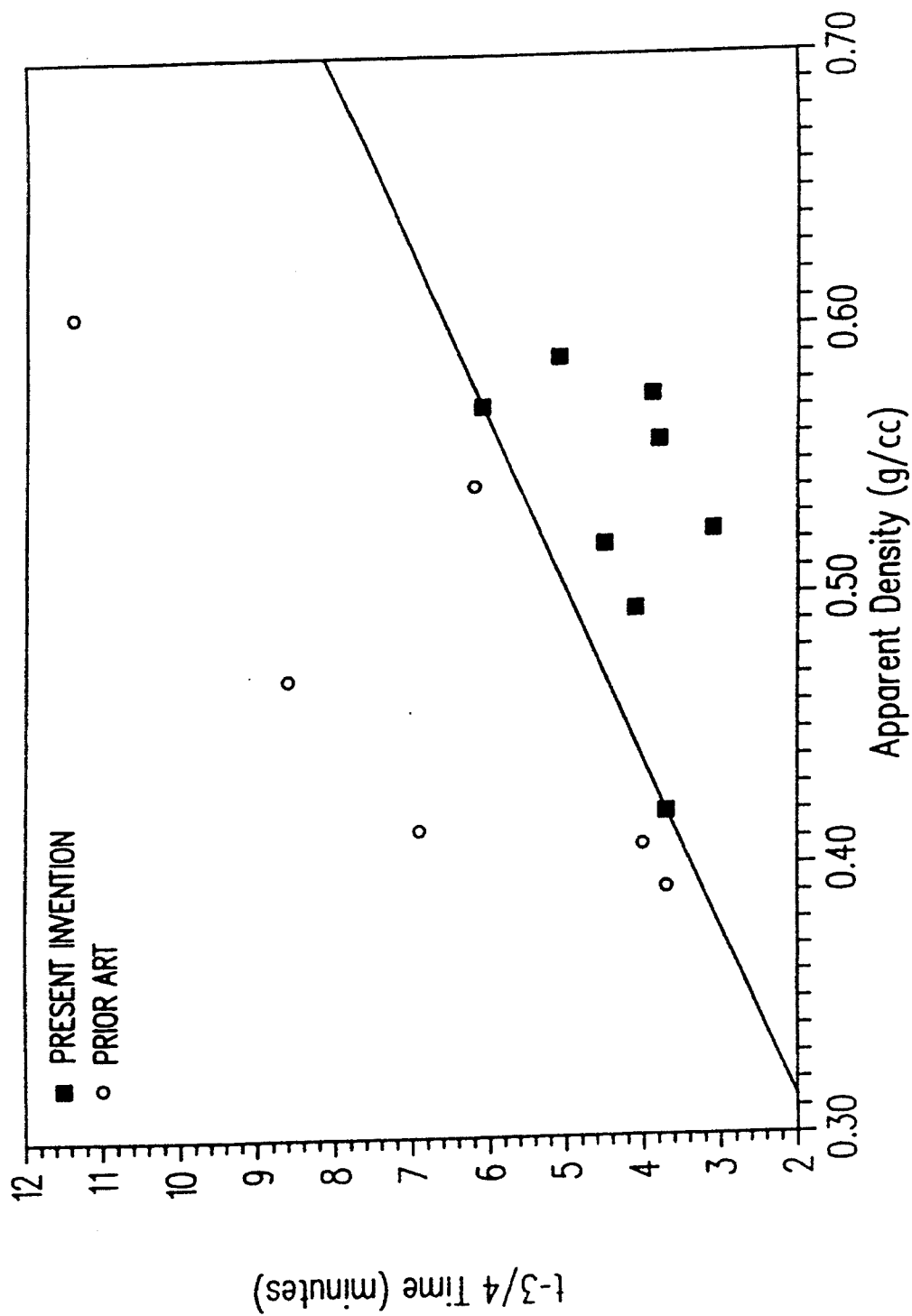
FIG. 2 graphically illustrates the higher catalytic activity achievable at a given carbonaceous char density by the present invention relative to that achievable by the prior art.

The $t-\frac{3}{4}$ time is determined in the following manner: with reference to FIG. 1, an apparatus is shown which is used to measure the $t-\frac{3}{4}$ times of the present invention. Apparatus 10 includes a Dewar 11 (Catalog Number 10-195A, Fisher Scientific, Pittsburgh Pa., or equivalent) positioned on a magnetic stirrer 12 (Model PC-351, Corning Hot Plate Stirrer, Corning Scientific Products, Corning, N.Y., or Model 18425 Nuova II Stir Plate, Thermolyne Corporation, Dubuque Iowa, or equivalent) and containing therein a magnetic stir bar 13. A beveled, tightly fitting, closed-cell styrofoam cap 14 is positioned in the top of Dewar 11 and includes a funnel 15, a vent 16 and an opening 17 therethrough and into Dewar 11. Through opening 17 is positioned thermocouple 18 which is electrically connected to ice point compensator 21 and strip chart recorder 22. In practice, the carbonaceous char to be tested is first pulverized such that greater than 90% of the material would pass through a 325 mesh U.S. Standard Series sieve. The styrofoam cap 14 of dewar 11 is removed and a 0.250 gram portion of this pulverized material is placed therein. Deionized water (100 mL) is then added to the Dewar. The addition of this water is performed in such a manner that any pulverized carbonaceous char clinging to the sides of Dewar 11 is carried into the main body of the water in the bottom. Next, a 50 mL aliquot of aqueous buffer solution is added to the Dewar. This buffer solution is 0.50 molar in $K_2HPO_4$ and 0.50 molar in $KH_2PO_4$. At this point magnetic stir bar 13 is placed into the Dewar and the magnetic stirrer is energized. Stirring speed is increased until a vortex greater than about $\frac{1}{8}''$ deep is formed in the mixture and the optimum stirring speed is achieved. The optimum stirring speed is selected such that additional increases in stirring speed do not significantly affect the peroxide decomposition time. Once identified, this optimum stirring speed can be used for all subsequent char samples. If stir bar 13 decouples from the magnetic field before the optimum stirring speed is achieved, it is replaced with a bar which couples more strongly with the magnetic field of the stiffer (12). Optionally, Dewar 11 can be replaced with an equivalent unit that, due to manufacturing variances, positions the stir bar farther into the magnetic field of the stirrer 12. If the stir bar still does not adequately couple with the magnetic field of the stirrer 12, the Dewar can be shortened by removing some of the bottom portion of the outside metal casing. Styrofoam cap 14 is now replaced, and thermocouple 18 (Type K or J, 1/16" diameter, Inconel sheathed, ungrounded or equivalent) is inserted through styrofoam cap 14 and into the mixture such that a measurement representative of the mixture temperature can be obtained, and the thermocouple ice point compensator 21 (Model MCJ-J or MCJ-K, Omega Engineering, Inc., Stamford, Conn. or equivalent) and strip chart recorder 22 are energized.

The strip chart recorder tracing is monitored until the system is seen to come to thermal equilibrium at ambient temperature. Once thermal equilibrium is achieved, 50 mL of an aqueous hydrogen peroxide solution (0.42 moles $H_2O_2$ per 50 mL) is added, as rapidly as possible, to the Dewar through the funnel 15 in the styrofoam cap. Care is taken to ensure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. Using the materials and procedures described, this constant temperature is typically about 40 C. greater than ambient temperature. At this point, the styrofoam cap is removed from the Dewar and the action of the stir bar is observed.

If the stir bar is no longer mixing the solution in the desired manner the entire procedure is repeated. If adequate mixing is observed, the elapsed time required for the recorder tracing to reach 75% of its maximum, constant, deflection is determined. This value represents the time required for the catalytically active carbonaceous char to decompose three-fourths of the available hydrogen peroxide and is referred to as the $t-\frac{3}{4}$ time.

EXAMPLE 2

Bituminous coal was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100 C. to 200 C. at a rate of 200 C. per hour, then from 200 C. to 325 C. at a rate of 83 C. per hour, held at 325 C. for 5 hours, and finally heated from 325 C. to 450 C. at a rate of 125 C. per hour.

The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950 C. under an inert gas atmosphere and maintained at that temperature for 1 hour. Immediately following this calcination treatment the resultant material was activated with steam. Following activation, the material was cooled to ambient temperature under an inert gas atmosphere. The activated carbon so produced, when sized to less than 4 mesh (U.S. Standard Series Sieves) and greater than 6 mesh (U.S. Standard Series Sieves), exhibited an Apparent Density (Test Method TM-7, Calgon Carbon Company, Pittsburgh Pa.) of 0.519 grams per cc. The catalytic activity ($t-\frac{3}{4}$ time) of this char was 4.5 minutes.

EXAMPLE 3

Bituminous coal, as used in Example 2, was pulverized with about 4 to 6% coal tar pitch, and briquetted. The resultant briquettes were crushed and sized to produce an approximately less than 4 mesh size and greater than 10 mesh size (U.S. Standard Series Sieves) material. In the presence of large quantities of excess air, this material was oxidized by heating from 100 C. to 200 C. at a rate of 200 C. per hour, then from 200 C. to 350 C. at a rate of 100 C. per hour, held at 350 C. for 5 hours, and finally heated from 350 C. to 450 C. at a rate of 100 C. per hour.

The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950 C. under an inert gas atmosphere and maintained at that temperature for 1 hour. Immediately following this calcination treatment the resultant material was activated with steam. Following activation, the material was cooled to ambient temperature under an inert gas atmosphere. The activated carbon so produced, when sized to less than 4 mesh (U.S. Standard Series Sieves) and greater than 6 mesh (U.S. Standard Series Sieves), exhibited an Apparent Density (Test Method TM-7, Calgon Carbon Company, Pittsburgh Pa.) of 0.495 grams per cc. This carbon exhibited a $t-\frac{3}{4}$ time of 4.1 minutes.

EXAMPLE 4

Bituminous coal, as used in Example 2, was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100 C. to 200 C. at a rate of 200 C. per hour, then from 200 C. to 350 C. at a rate of 100 C. per hour, held at 350 C. for 4 hours, and finally heated from 350 C. to 450 C. at a rate of 100 C. per hour.

The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950 C. under an inert gas atmosphere and maintained at that temperature for 1 hour. Immediately following this calcination treatment the resultant material was activated with steam. The material was then cooled to ambient temperature under an inert gas atmosphere. The activated carbon so produced, when sized to less than 4mesh (U.S. Standard Series Sieves) and greater than 6 mesh (U.S. Standard Series Sieves), exhibited an Apparent Density (Test Method TM-7, Calgon Carbon Company, Pittsburgh Pa.) of 0.571 grams per cc. This char exhibited a $t-\frac{3}{4}$ time of 6.1 minutes.

EXAMPLE 5

A bituminous coal was pulverized with about 6% coal tar pitch. This pulverized material was then intimately blended with 10% powdered corn starch. After blending, 20% water was added to the resultant mixture. This wet mix was then extruded using a ring-die pelletizer to produce pellets of approximately 4 mm diameter. The resultant pellets were then dried and screened to remove fines. In the presence of large quantities of excess air, these pellets were oxidized by heating from 100 C to 200 C. at a rate of 200C. per hour, then from 200 C. to 350 C. at a rate of 100 C. per hour, held at 350 C. for 4.5 hours, and finally heated from 350 C. to 450 C. at a rate of 100 C. per hour.

The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of this oxidized, impregnated low-temperature char was rapidly heated to 900 C. under an inert gas atmosphere and maintained at that temperature for 1 hour. Immediately following this calcination treatment the resultant material was activated with steam. Following activation, the material was cooled to ambient temperature under an inert gas atmosphere. The activated carbon pellets so produced were approximately 4 mm in diameter and exhibited an Apparent Density (Test Method TM-7, Calgon Carbon Company, Pittsburgh Pa.) of 0.420 grams per cc. This char exhibited a $t-\frac{3}{4}$ time of 3.7 minutes.

EXAMPLE 6

Bituminous coal as used in Example 2 was pulverized with about 4 to 6% coal tar pitch, and briquetted. The resultant briquettes were crushed and sized to produce an approximately less than 4 mesh size and greater than 10 mesh size (U.S. Standard Series Sieves) material. In the presence of large quantities of excess air, this material was oxidized by heating from 100 C. to 200 C. at a rate of 200 C. per hour, then from 200 C. to 350 C. at a rate of 100 C. per hour, held at 350 C. for 4 hours, and finally heated from 350 C. to 450 C. at a rate of 100 C. per hour.

The resultant oxidized material was cooled to near ambient temperatures in a low oxygen content inert atmosphere and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950 C. under an inert gas atmosphere and maintained at that temperature for 1 hour. Immediately following this calcination treatment the resultant material was activated with steam for approximately 15 minutes. Following activation, this material was cooled to ambient temperatures under an inert atmosphere. This slightly activated char was then heated to 425 C. and maintained at that temperature for 90 minutes in the presence of excess air. The slightly activated char that resulted from this treatment was cooled in a low oxygen content atmosphere and subsequently impregnated with an aqueous urea solution and dried. The quantity of urea solution used was sufficient to produce a 4% urea loading on a dry weight basis. After impregnation, a portion of the impregnated mildly activated carbon was rapidly heated to 950 C. under an inert gas atmosphere and maintained at that temperature for 1 hour. Immediately following this calcination treatment the resultant material was activated with steam. Following this activation the material was cooled to ambient temperature under an inert gas atmosphere. The activated carbon so produced, when sized to less than 4 mesh (U.S. Standard Series Sieves) and greater than 6 mesh (U.S. Standard Series Sieves), exhibited an Apparent Density Crest Method TM-7, Calgon Carbon Corporation, Pittsburgh Pa.) of 0.575 grams per cc. This carbon exhibited a $t-\frac{3}{4}$ time of 3.9 minutes.

EXAMPLE 7 (Prior Art)

WPL-L, a commercially available activated carbon (Calgon Carbon Corporation, Pittsburgh Pa.) was sized to produce an approximately less than 12 mesh size and greater than 20 mesh size (U.S. Standard Series sieves) material.

Portions of this material were heated to 900 C. in a small rotary kiln under an inert gas flow. Once the desired 900 C. temperature was achieved, the inert gas flow was stopped and a mixture of ammonia gas and water vapor having a molar ratio of 0.4 moles $NH_3$ to 1.0 moles $H_2O$ was injected into the kiln. These conditions were maintained for differing periods of time, after which the treated carbons were cooled to ambient temperature under an inert gas flow. Two carbon samples produced in this manner exhibited Apparent Densities (Test Method TM-7, Calgon Carbon Corporation, Pittsburgh Pa.) of 0.606 grams per cc and 0.541 grams per cc.

The catalytic activities ($t-\frac{3}{4}$ times) of the carbons described above were 11.4 minutes for the carbon exhibiting the 0.606 g/cc Apparent Density and 6.2 minutes for the carbon exhibiting the 0.541 g/cc Apparent Density.

EXAMPLE 8 (Prior Art)

WPL-L, a commercially available activated carbon (Calgon Carbon Corporation, Pittsburgh Pa.) was sized to produce an approximately less than 12 mesh size and greater than 20 mesh size (U.S. Standard Series sieves) material.

A portion of this material was heated to 950 C. in a small rotary kiln under an inert gas flow. Once the desired 950 C. temperature was achieved, the inert gas flow was stopped and a mixture of ammonia gas and water vapor having a molar ratio of 0.4 moles $NH_3$ to 1.0 moles $H_2O$ was injected into the kiln. These conditions were maintained for 180 minutes, after which the treated carbon was cooled to ambient temperature under an inert gas flow. A carbon sample produced in this manner exhibited an Apparent Density of 0.470 grams per cc. This carbon exhibited a $t-\frac{3}{4}$ time of 8.6 minutes.

EXAMPLE 9 (Prior Art)

F300, a commercially available activated carbon (Calgon Carbon Corporation, Pittsburgh, Pa.), was sized to produce an approximately less than 12 mesh size and greater than 20 mesh size (U.S. Standard Series Sieves) material.

Portions of this material were heated to 950 C. in a small rotary kiln under an inert gas flow. Once the desired 950 C. temperature was achieved, the inert gas flow was stopped and a mixture of ammonia gas and water vapor having a molar ratio of 0.2 moles $NH_3$ to 1.0 moles $H_2O$ was injected into the kiln. These conditions were maintained for differing periods of time, after which the treated carbons were cooled to ambient temperature under an inert gas flow. Two carbon samples produced in this manner exhibited Apparent Densities (Test Method TM-7, Calgon Carbon Corporation, Pittsburgh Pa.) of 0.392 grams per cc and 0.414 grams per cc.

The catalytic activities (t−¾ times) of the carbons described above were 3.7 minutes for the carbon exhibiting the 0.392 g/cc Apparent Density and 6.9 minutes for the carbon exhibiting the 0.414 g/cc Apparent Density.

EXAMPLE 10 (Prior Art)

F300, a commercially available activated carbon (Calgon Carbon Corporation, Pittsburgh Pa.) was sized to produce an approximately less than 12 mesh size and greater than 20 mesh size (U.S. Standard Series sieves) material. A portion of this material was mixed with water and nitric acid in the ratio of 125 grams of carbon to 1 liter of 12 molar nitric acid solution. This mixture was then heated to a temperature between 85 C. and 100 C. The mixture was maintained in this temperature range for about seven hours. At the end of this time period the mixture was cooled to ambient temperature. After cooling, the supernatant liquid was decanted and the carbon extensively rinsed with water. The carbon was then dried in air at 125 C. A portion of this nitric acid treated carbon was then placed into a small rotary kiln. A flow of ammonia gas was established into this kiln. At this point the kiln temperature was raised from ambient to 950 C. over a time period of about 1.5 hours. The kiln temperature was maintained at 950 C. for 30 minutes. Following this treatment, the ammonia flow to the kiln was stopped and a flow of inert gas to the kiln initiated. The kiln was then cooled to ambient temperature at which time the flow of inert gas was stopped and the carbon removed from the kiln. A carbon sample produced in this manner exhibited an Apparent Density (Test Method TM-7, Calgon Carbon Corporation, Pittsburgh Pa.) of 0.408 grams per cc. This carbonaceous char exhibited a t−¾ time of 4 minutes.

While presently preferred embodiments of the invention have been shown, the invention may be otherwise embodied within the scope of the appended claims.

What is claimed is:

1. A carbonaceous char having a t−¾ time at a given Apparent Density less than or equal to:

(15.9 cc min)×(Apparent Density)−2.98 min, where t−¾ time is equal to three-fourths of the elapsed time required for 0.250 gms of said carbonaceous char from ambient temperatures to decompose 0.42 mole of $H_2O_2$ in an aqueous solution having a pH of about 7.

2. The carbonaceous char of claim 1 wherein the range of Apparent Density is about 0.3 to 0.7 grams per cc.

3. The carbonaceous char of claim 1 or 2 wherein said char is produced by oxidation of a bituminous coal or a coal having bituminous properties.

4. The carbonaceous char of claim 1 wherein the char is granular, pellets, shaped, or powdered.

* * * * *